United States Patent [19]
Kondo et al.

[11] Patent Number: 5,966,179
[45] Date of Patent: Oct. 12, 1999

[54] INFORMATION SIGNAL ENCODING APPARATUS, ENCODING METHOD THEREOF, INFORMATION SIGNAL DECODING METHOD, AND INFORMATION SIGNAL RECORD MEDIUM THEREOF

[75] Inventors: Tetsujiro Kondo; Yasuhiro Fujimori; Kenji Takahashi; Kunio Kawaguchi, all of Kanagawa, Japan

[73] Assignee: Sony Corporation, Tokyo, Japan

[21] Appl. No.: 08/831,225

[22] Filed: Apr. 2, 1997

Related U.S. Application Data

[62] Division of application No. 08/685,087, Jul. 23, 1996, Pat. No. 5,703,652.

[30] Foreign Application Priority Data

Jul. 28, 1995 [JP] Japan ..................................... 7-212684

[51] Int. Cl.$^6$ .................................................. H04N 7/12
[52] U.S. Cl. ........................................... 348/408; 348/421
[58] Field of Search ..................................... 348/422, 421, 348/405, 409, 384, 390, 400–404, 408, 415, 416, 420, 418, 413; 382/232, 233, 236, 238, 251; 341/200; 375/244, 245; 386/111, 112, 33, 34, 35, 116; H04N 7/13, 7/131, 7/12

[56] References Cited

U.S. PATENT DOCUMENTS

| | | | |
|---|---|---|---|
| 4,670,851 | 6/1987 | Murakami et al. ...................... | 348/418 |
| 4,890,161 | 12/1989 | Kondo ...................................... | 348/421 |
| 5,436,665 | 7/1995 | Ueno et al. .............................. | 348/413 |
| 5,534,931 | 7/1996 | Kondo ...................................... | 348/420 |
| 5,539,468 | 7/1996 | Suzuki et al. ............................ | 348/403 |

*Primary Examiner*—Tommy P. Chin
*Assistant Examiner*—Y. Lee
*Attorney, Agent, or Firm*—Frommer Lawrence & Haug, LLP.; William S. Frommer

[57] ABSTRACT

An input digital information signal is prediction-encoded and thereby difference signals are generated. The difference signals are block segmented. A maximum value and a minimum value of each block are detected. Whether or not the range of levels of the maximum value MAX and the minimum value MIN crosses 0, a mode determining circuit 5 determines a quantizing mode and generates a mode signal MODE that represents the determined quantizing mode. When the range of the levels crosses 0, a first quantizing mode is selected. Otherwise, a second quantizing mode is selected. In the first quantizing mode, the quantizing circuit 6 performs the normal quantizing process. In the second quantizing mode, the quantizing circuit 6 performs a code conversion in such a manner that the number of bits of quantized output data is smaller than that of the normal quantizing process.

2 Claims, 11 Drawing Sheets

Fig. 3A
| a | b | c | d | | | |
|---|---|---|---|---|---|---|
| e | f | A | B | C | D | |
| g | h | E | F | G | H | |
| | | | I | J | K | L |
| | | | M | N | O | P |
| | | | | | | |
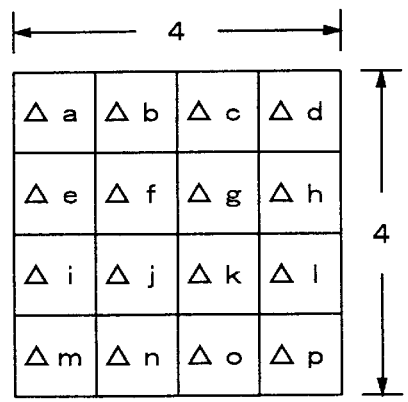
Fig. 3B
Fig. 5
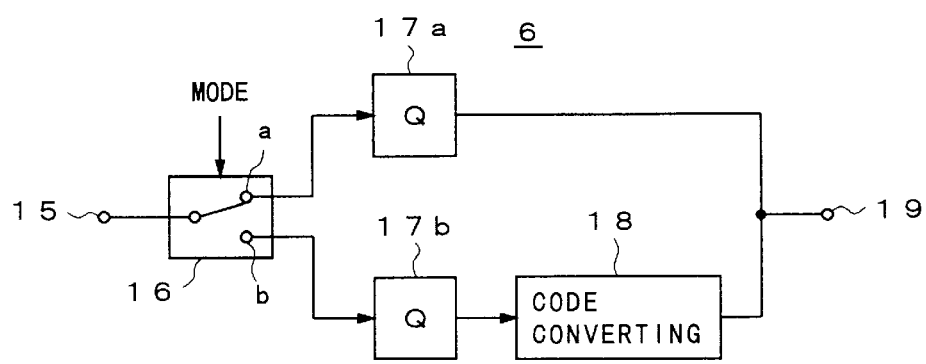

Fig. 6A
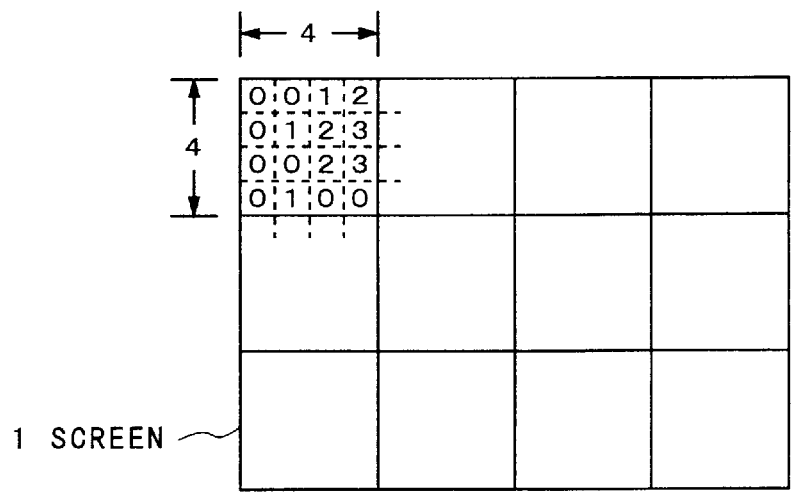
Fig. 6B
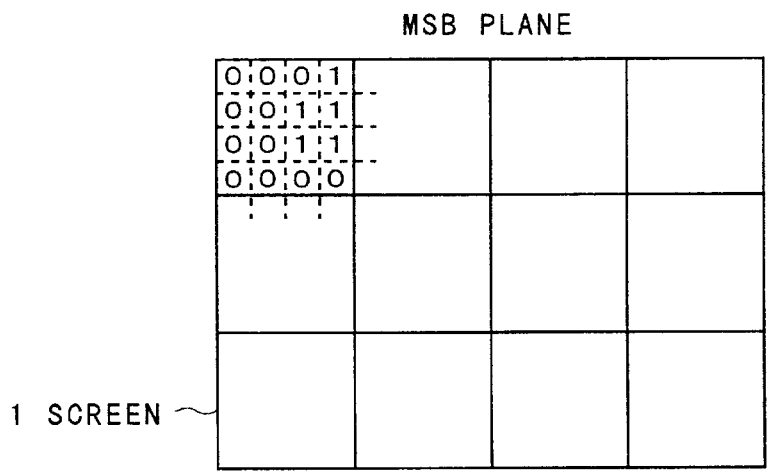
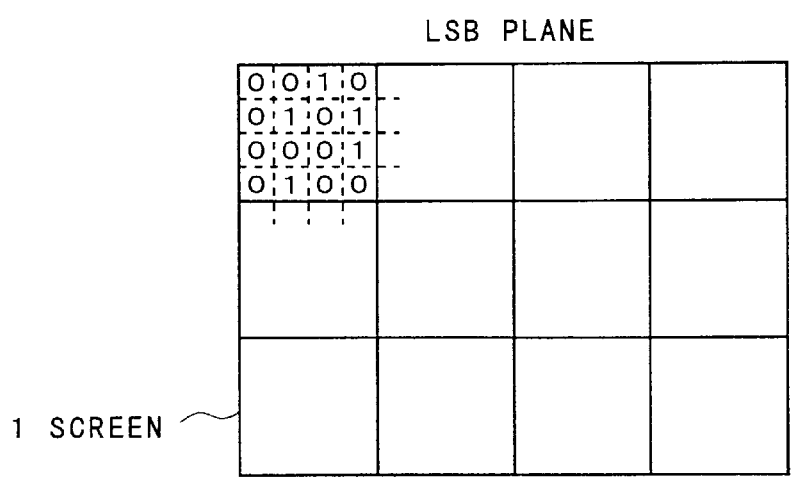

Fig. 9
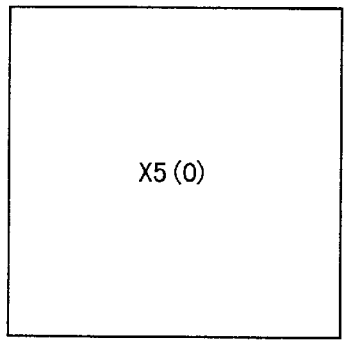
FIFTH HIERARCHICAL LEVEL,
BLOCK SIZE (1/16 × 1/16)
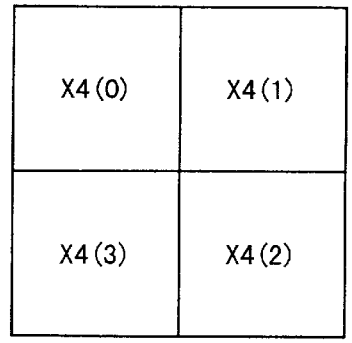
FOURTH HIERARCHICAL LEVEL,
BLOCK SIZE (1/8 × 1/8)
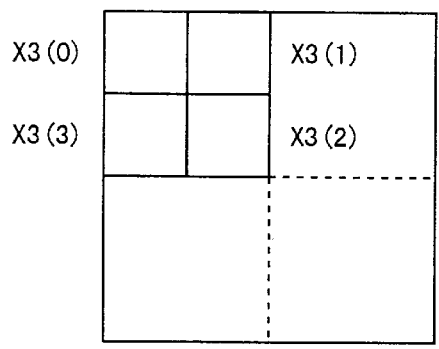
THIRD HIERARCHICAL LEVEL,
BLOCK SIZE (1/4 × 1/4)
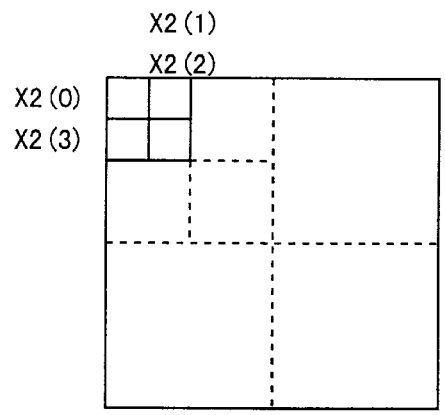
SECOND HIERARCHICAL LEVEL,
BLOCK SIZE (1/2 × 1/2)
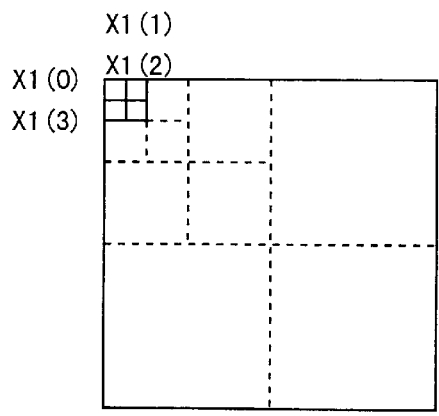
FIRST HIERARCHICAL LEVEL,
BLOCK SIZE (1 × 1)

INFORMATION SIGNAL ENCODING APPARATUS, ENCODING METHOD THEREOF, INFORMATION SIGNAL DECODING METHOD, AND INFORMATION SIGNAL RECORD MEDIUM THEREOF

This application is a division of application Ser. No. 08/685,087, filed Jul. 23, 1996, now U.S. Pat. No. 5,703,652.

BACKGROUND OF THE INVENTION

1. Field the Invention

The present invention relates to an information signal encoding apparatus for decreasing the amount of generated data of digital information signals such as a digital audio signal and a digital picture signal, an encoding method thereof, and a decoding method thereof.

2. Description of Related Art

A variety of prediction encoding methods for decreasing the amount of transmission information such as a digital audio signal and a digital picture signal are known. As an example, in the one-dimensional DPCM method, the difference between an input sample value and a predicted value is formed in the temporal direction. In the two-dimensional DPCM method, the difference between an input sample value and a predicted value is formed in the spatial direction. Since the digital information signal has correlation in the temporal direction and the spatial direction, the levels of difference signals are lower than the sample values. Thus, since the difference signals are requantized with a smaller number of quantizing bits than the original number of quantizing bits, the amount of information can be compressed.

As an example of the quantizing apparatus using the difference signals, a nonlinear type quantizing apparatus is known. In the nonlinear type quantizing apparatus, the quantizing step width is finely divided at nearly 0 of the levels of the difference signals, whereas the quantizing step width is coarsely divided in proportion to the levels of the difference signals. In the conventional quantizing apparatus (including the nonlinear type quantizing apparatus) quantizes all levels of the difference signals. For example, when one sample (one pixel) of a digital picture signal is quantized with eight bits, the difference signals have values in the range from (−255 to +255). In other words, the conventional quantizing apparatus performs the quantizing process for all the range.

Since the conventional quantizing apparatus performs the quantizing process for all the range of the difference signals, when the number of quantizing bits is decreased, the quantizing accuracy is deteriorated. In contrast, when the number of quantizing bits is increased, the amount of information generated is proportionally increased. Thus, when data is decoded, the quality of the resultant audio signal and picture signal is not satisfactorily high.

OBJECT AND SUMMARY OF THE INVENTION

Therefore, an object of the present invention is to provide an information signal encoding apparatus that allows the number of quantizing bits with which difference signals are quantized and the amount of quantized output data to be decreased, an encoding method thereof, and a decoding method thereof. In other words, the difference signals are block segmented. When the range of levels of the difference signals of each block satisfies a particular condition, the quantizing mode is switched in such a manner that the number of quantizing bits decreases.

A first aspect of the present invention is an information signal encoding apparatus for encoding an input digital information signal in such a manner that the amount of data generated decreases, the apparatus comprising a means for generating difference signals representing differences between sample values of the input digital information signal, a means for block segmenting the difference signals, a means for detecting a maximum value and a minimum value of the difference signals of each block, a mode determining means for determining whether or not the range of levels of the difference signals of each block crosses 0 corresponding to the maximum value and the minimum value, assigning a first quantizing mode when the range of the levels crosses 0, and assigning a second quantizing mode when the range of the levels does not cross 0, a quantizing means for quantizing the difference signals with a predetermined number of bits smaller than the original number of bits in the first quantizing mode and for quantizing the difference signals with a predetermined number of bits smaller than the original number of bits and performing a code conversion for decreasing the number of bits in the second quantizing mode, and a transmitting means for transmitting information identifying the first quantizing mode and the second quantizing mode and output data of said quantizing means.

A second aspect of the present invention is an information signal encoding method for encoding an input digital information signal in such a manner that the amount of data generated decreases, the method comprising the steps of (a) generating difference signals representing differences between sample values of the input digital information signal, (b) block segmenting the difference signals, (c) detecting a maximum value and a minimum value of the difference signals of each block, (d) determining whether or not the range of levels of the difference signals of each block crosses 0 corresponding to the maximum value and the minimum value, assigning a first quantizing mode when the range of the levels crosses 0, and assigning a second quantizing mode when the range of the levels does not cross 0, (e) quantizing the difference signals with a predetermined number of bits smaller than the original number of bits in the first quantizing mode and for quantizing the difference signals with a predetermined number of bits smaller than the original number of bits and performing a code conversion for decreasing the number of bits in the second quantizing mode, and (f) transmitting information identifying the first quantizing mode and the second quantizing mode and output data of the step (e).

A third aspect of the present invention is an information signal encoding apparatus for generating at least first hierarchical data and second hierarchical data by an input digital information signal, encoding the first hierarchical data and the second hierarchical data, and transmitting the encoded data, the apparatus comprising a means for forming the second hierarchical data with a resolution lower than the first hierarchical data, a means for predicting the first hierarchical data by the second hierarchical data, a means for forming difference signals representing differences between the predicted data and the first hierarchical data, a means for block segmenting the difference signals, a means for detecting a maximum value and a minimum value of the difference signals of each block, a mode determining means for determining whether or not the range of levels of the difference signals of each block crosses 0 corresponding to the maximum value and the minimum value, assigning a first quantizing mode when the range of the levels crosses 0, and assigning a second quantizing mode when the range of the levels does not cross 0, a quantizing means for quantizing the difference signals with a predetermined number of bits smaller than the original number of bits in the first quantizing mode and for quantizing the difference signals with a predetermined number of bits smaller than the original number of bits and performing a code conversion for decreasing the number of bits in the second quantizing mode, and a transmitting means for transmitting information identifying the first quantizing mode and the second quantizing mode and output data of said quantizing means.

A fourth aspect of the present invention is an information signal encoding method for generating at least first hierarchical data and second hierarchical data by an input digital information signal, encoding the first hierarchical data and the second hierarchical data, and transmitting the encoded data, the method comprising the steps of (a) forming the second hierarchical data with a resolution lower than the first hierarchical data, (b) predicting the first hierarchical data by the second hierarchical data, (c) forming difference signals representing differences between the predicted data and the first hierarchical data, (d) block segmenting the difference signals, (e) detecting a maximum value and a minimum value of the difference signals of each block, (f) determining whether or not the range of levels of the difference signals of each block crosses 0 corresponding to the maximum value and the minimum value, assigning a first quantizing mode when the range of the levels crosses 0, and assigning a second quantizing mode when the range of the levels does not cross 0, (g) quantizing the difference signals with a predetermined number of bits smaller than the original number of bits in the first quantizing mode and for quantizing the difference signals with a predetermined number of bits smaller than the original number of bits and performing a code conversion for decreasing the number of bits in the second quantizing mode, and (h) transmitting information identifying the first quantizing mode and the second quantizing mode and output data of the step (g).

A fifth aspect of the present invention is an information signal decoding method for decoding data of which information identifying a first quantizing mode and a second quantizing mode and information of difference signals have been transmitted, the difference signals have been quantized with a smaller number of bits than the original number of bits in the first quantizing mode, and the difference signals have been quantized with a smaller number of bits than the original number of bits and a code conversion has been performed for decreasing the number of bits in the second quantizing mode, the method comprising the steps of (a) dequantizing data corresponding to the identification information in the first quantizing mode or performing a code conversion for data and dequantizing the data in the second quantizing mode, and (b) block desegmenting the dequantized difference signals and restoring original sequence of data.

When the concentration of the distribution of the levels of the difference signals is improved, the difference signals can be requantized with a smaller number of bits than the original number of quantizing bits. In addition, when the distribution of the levels of the difference signals satisfies a particular condition, the difference signals can be quantized with a much smaller number of bits than before.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 3A and 3B are schematic diagrams for explaining generation of difference signals and block segmentation thereof according to the embodiment of the present invention;

FIG. 5 is a block diagram showing an example of the structure of a quantizing circuit according to the embodiment of the present invention;

FIGS. 6A and 6B are schematic diagrams for explaining bit planes according to the embodiment of the present invention;

FIG. 9 is a schematic diagram for explaining an example of the hierarchical encoding process;

DETAILED DESCRIPTION OF PREFERRED EMBODIMENTS

Figure 1:
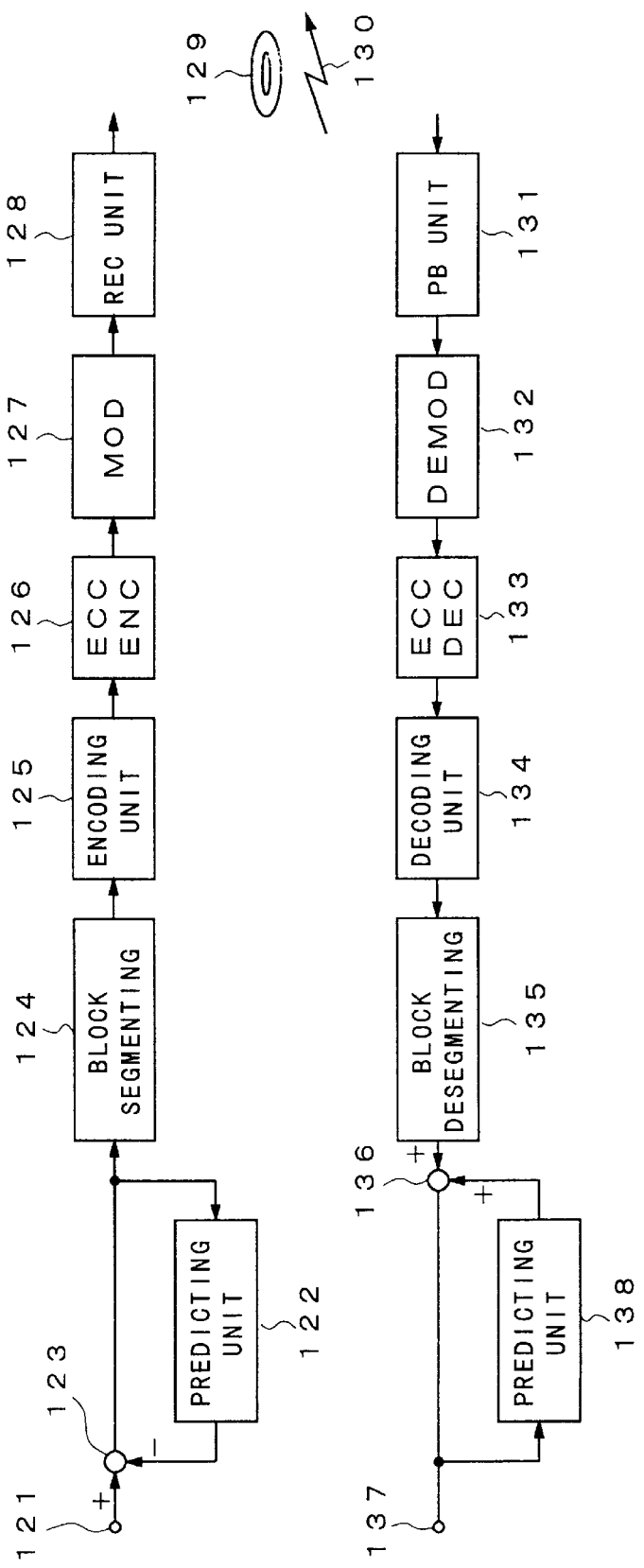
FIG. 1 is a block diagram showing an example of the structure of a recording/reproducing system or a transmitting system according to the present invention.

Next, with reference to the accompanying drawings, embodiments of the present invention will be described. The present embodiment is applied for a digital picture signal of which a video signal has been sampled at a predetermined sampling frequency and each sample has been converted into a predetermined number of quantizing bits. FIG. 1 shows the overall structure of the system according to the embodiment of the present invention.

In FIG. 1, a digital video signal is supplied to an input terminal 121. The input signal is supplied to a subtracting unit 123. The output data (difference signals) of the subtracting unit 123 is supplied to a block segmenting circuit 124 and a predicting unit 122. The predicting unit 122 generates a predicted signal and supplies it to the subtracting unit 123. The subtracting unit 123 subtracts the predicted signal from the input signal and generates a predicted difference. The predicted difference is supplied as difference signals to the block segmenting circuit 124. The block segmenting circuit 124 converts data of raster scanning sequence into data of block sequence. The block-segmented difference signals are supplied to an encoding unit 125.

As will be described later, a quantizing circuit of the encoding unit 125 selects a first quantizing mode or a second quantizing mode corresponding to the distribution of the frequency of the block-segmented difference signals. For example, in the case that the number of bits of the difference signals is eight, when the first quantizing mode is selected, the encoding unit 125 generates quantized output data of three bits. On the other hand, when the second quantizing mode is selected, the quantizing unit 125 generates quantized output data of two bits into which data of three bits has been converted by a code conversion table.

The encoded output data of the encoding unit 125 is supplied to an error-correction-code encoder 126. The error-correction-code encoder 126 adds a redundant code for the error-correction-code encoding process to the output data of the encoding unit 125. The output data of the error-correction-code encoder 126 is supplied to a modulating portion 127. The modulating portion 127 modulates the digital signal as the output signal of the error-correction-code encoder 126 into a format of which the digital signal can be recorded or transmitted. The output signal of the modulating portion 127 is supplied to a recording unit 128. The recording unit 128 records the record signal on an information signal record medium 129. Alternatively, data can be transmitted through a transmission path 130. In this case, a transmitting unit is used instead of the recording unit 128. The information signal record medium 129 is a disc-shaped or tape-shaped record medium corresponding to the magnetic recording method, the magneto optical recording method, the phase change recording method, or the like. In addition, a semiconductor memory is a kind of record medium.

Data recorded on the record medium 129 is reproduced (played back) by a reproducing unit (or playback unit) 131. Alternatively, data is received through the transmission path 130. The output data of the reproducing unit 131 is supplied to a demodulating portion 132. The demodulating portion 132 demodulates the output data of the reproducing unit 131. The output data (demodulated data) of the demodulating portion 132 is supplied to an error-correction-code decoder 133. The decoder 133 corrects an error of the demodulated data with a redundant code. When the decoder 133 cannot correct an error of the demodulated data, the decoder 133 quietly trims the error.

The output data of the error-correction-code decoder 133 is supplied to a decoding unit 134. As will be described later, the decoding unit 134 performs the dequantizing process for converting the quantized output data into a representative value (dequantized value). The dequantizing process is the reverse process of the encoding unit 125. The dequantizing circuit of the decoding unit 134 performs the dequantizing process corresponding to the quantizing mode represented by a mode signal. The decoding unit 134 generates decoded difference signals. The decoded difference signals are supplied to a block desegmenting circuit 135. The block desegmenting circuit 135 restores the data of block sequence to the data of raster scanning sequence.

The decoded difference signals are supplied to an adding circuit 136. The adding circuit 136 generates a decoded picture signal. The decoded picture signal is obtained from an output terminal 137. In addition, the decoded picture signal is supplied to a predicting unit 138. The predicting unit 138 generates a predicted signal. The predicted signal is supplied to the adding circuit 136.

Figure 2:
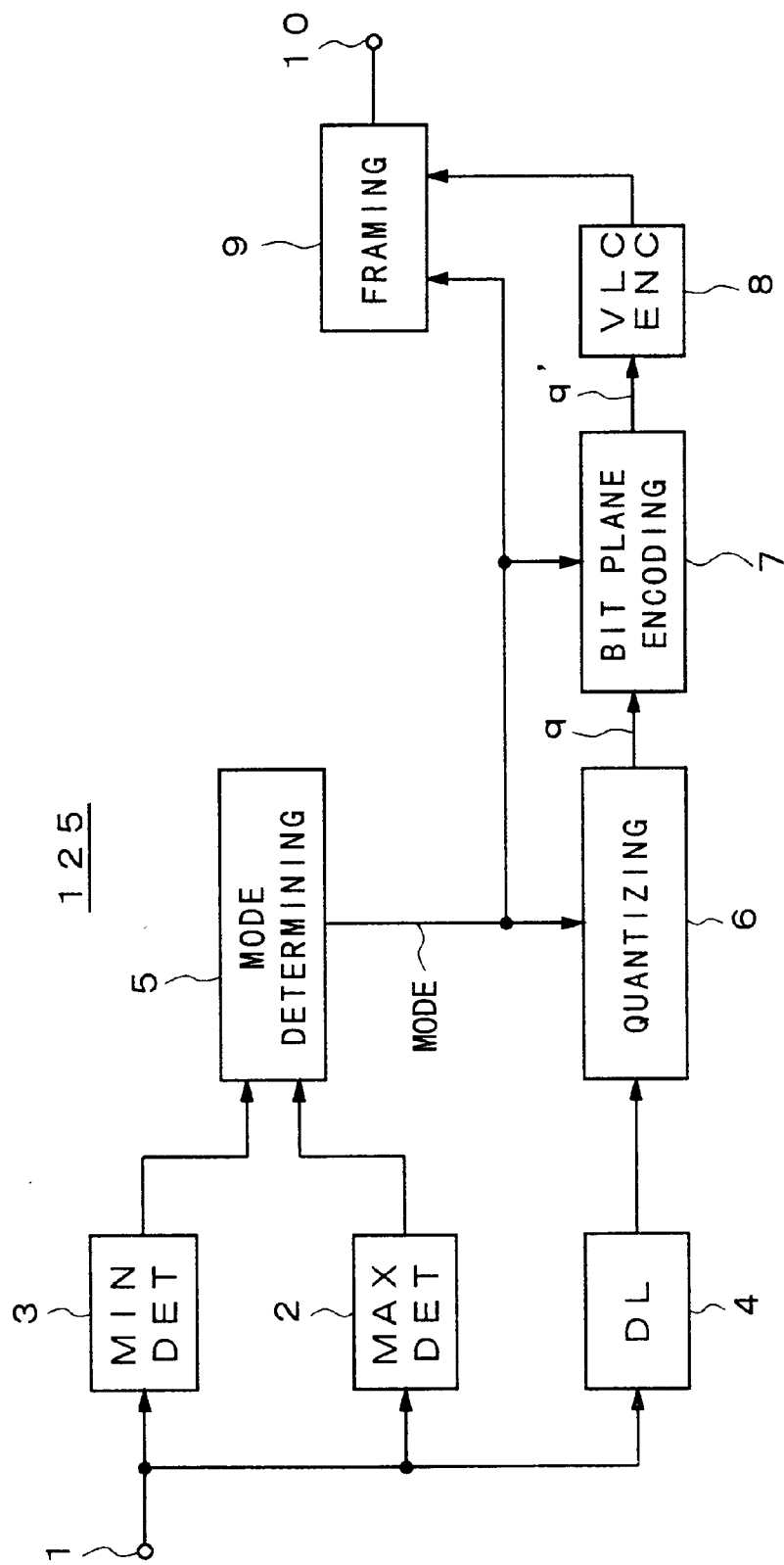
FIG. 2 is a block diagram showing an embodiment of the present invention.

FIG. 2 shows an example of the structure of the encoding unit 125. Block-segmented difference signals are supplied from the block segmenting circuit 124 to an input terminal 1. FIGS. 3A and 3B schematically show the structure of the difference signals. Each square in FIG. 3A corresponds to one pixel. In FIG. 3A, letters a to h represent locally decoded pixel values. Letters A to P represent pixel values that have not been encoded. A predicted value A' of a pixel value A is generated with adjacent locally-decoded pixel values by the predicting unit 122. For example, the predicted value A' is formed corresponding to a predicting formula as in A'=4c−3(b −f), A'=f+c−b, or the like. The predicted values of the pixel values B, C, and so forth are calculated with such predicting formulas. A predicted value is generally formed by a formula $\alpha a + \beta b + \gamma f$ (where $\alpha, \beta$, and $\gamma$ are constants).

The subtracting unit 123 subtracts a predicted value (for example, A') from a pixel value (for example, A) and generates a difference signal $\Delta a$. Likewise, the subtracting unit 123 generates difference signals $\Delta b, \Delta c$, and so forth. The block segmenting circuit 124 converts the generated difference signals into blocks. For example, as represented by a box of solid lines, data of a block composed of difference signals $\Delta a$ to $\Delta p$ corresponding to a block composed of (4×4) pixels is formed by the block segmenting circuit 124. When a digital audio signal is processed, predicted values in the temporal direction are formed and thereby one-dimensional blocks of difference signals are formed.

When the difference signals are block segmented, the concentration of the range of levels of the difference signals can be improved. When one pixel is composed of eight bits of data, the distribution of the frequency of difference signals of one screen ranges from −255 to +255 with the center of 0. Thus, the frequency of which the difference is 0 is maximum. However, when the difference signals are block segmented, the distribution of levels of the difference signals is more concentrated than the original distribution.

This is because the values of the difference signals of blocks in a narrow space are smaller than those of one screen in probability. In addition, the values of the difference signals of blocks have strong correlation. Thus, the block segmented difference signals can be requantized with a smaller number of bits than the original number of quantizing bits. When the levels of the brightness of blocks gradually vary in for example the diagonal direction, the frequency of the value 0 does not become maximum. The concentration of the distribution of levels of the difference signals can be also improved by another method rather than the block segmenting method.

Returning back to FIG. 2, the encoding unit 125 will be described. Difference signals are supplied from the input terminal 1 to a maximum value detecting circuit 2, a minimum value detecting circuit 3, and a delaying circuit 4. The maximum value detecting circuit 2 detects a maximum value MAX of each block. In contrast, the minimum value detecting circuit 3 detects a minimum value MIN of each block. The detected maximum value MAX and minimum value MIN are supplied to a mode determining circuit 5.

The block-segmented difference signals, the maximum value MAX, and the minimum value MIN are supplied to the mode determining circuit 5. The mode determining circuit 5 determines the quantizing mode corresponding to the range of the levels of the difference signals of the block and generates a signal MODE (for example, one bit) that represents the mode. The mode signal MODE is supplied to a quantizing circuit 6. The difference signals are supplied from the input terminal 1 to the quantizing circuit 6 through a delaying circuit 4 that delays the phase thereof. The quantizing circuit 6 requantizes the difference signals with a smaller number of quantizing bits than the original number of quantizing bits (for example, eight bits). The quantizing circuit 6 selects the first quantizing mode or the second quantizing mode corresponding to the mode signal MODE.

The first quantizing mode is the normal quantizing mode of which difference signals (of eight bits) are requantized and quantized output data (of three bits for example) is generated as quantizing bits. On the other hand, the second quantizing mode is applied when the range of levels of block segmented difference signals does not cross 0. In this embodiment, when the minimum value MIN of the difference signals is larger than ($\Delta/2$), the second quantizing mode is applied (where $\Delta$ is a quantizing step expressed by $DR/2^n$ (n=number of requantizing bits); DR is a dynamic range expressed by (MAX−MIN)).

In the second quantizing mode, as with the first quantizing mode, a code signal (of three bits, for example) is converted into quantized output data with a smaller number of bits (for example, two bits) than before corresponding to a predetermined rule. The code conversion rule for converting a three-bit code into two-bit quantized data is as follows.

100-00
101-01
110-10
111-11

Figure 4A:
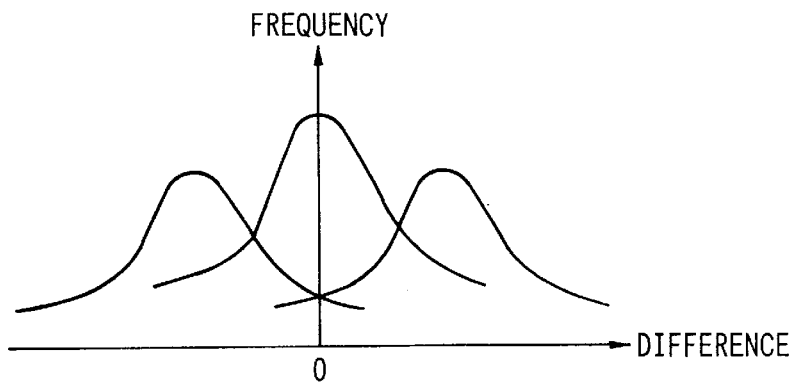
FIGS. 4A, 4B, and 4C are schematic diagrams for explaining the quantizing process corresponding to the embodiment of the present invention.
Figure 4B:
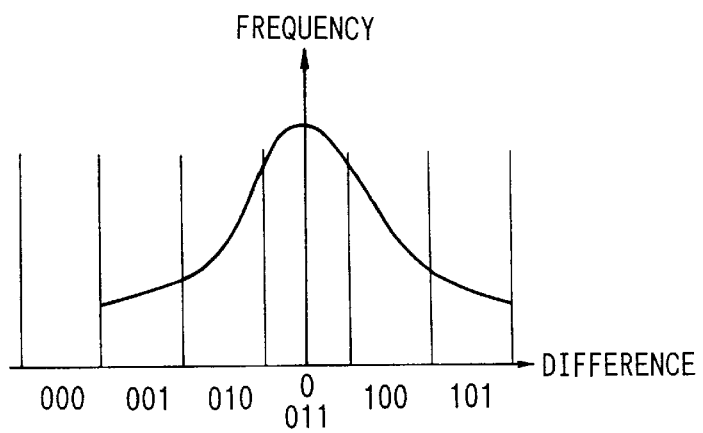
Figure 4C:
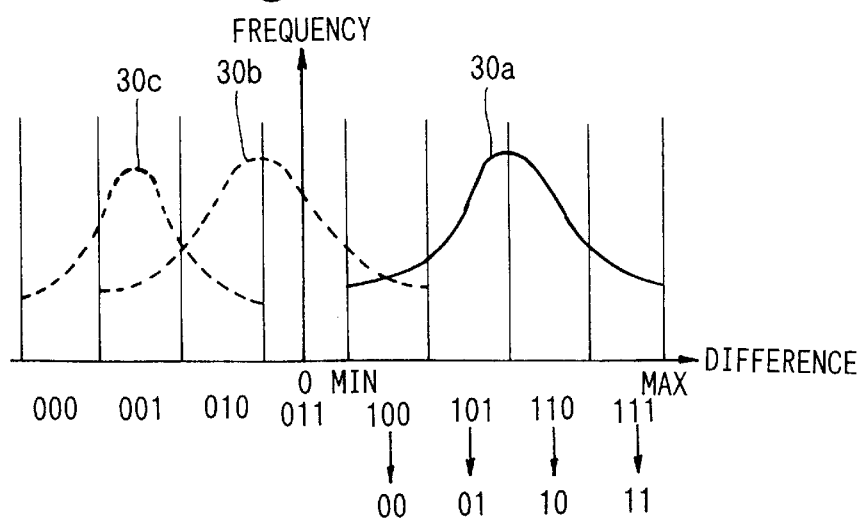

Next, with reference to FIGS. 4A, 4B, and 4C, the quantizing process is described. In one frame, the frequency of the difference signals is maximum at value 0. However, as shown in FIG. 4A, the frequency of block-segmented difference signals deviates block by block. FIG. 4A shows a distribution of difference signals that deviates on the negative side, a distribution of which the maximum frequency of difference signals accords with value 0, and a distribution of difference signals that deviates on the positive side.

FIG. 4B shows a frequency distribution of difference signals that crosses value 0. When difference signals are quantized, the range between MAX and MIN is divided by for example $2^3=8$. The same code is assigned difference signals in each divided region. When each code is restored, it is converted into the representative value at the center of the region. Generally, when the number of bits of a code is n, the range between MAX and MIN is divided by $2^n$. This quantizing process corresponds to the first quantizing mode.

FIG. 4C shows an example of the frequency distribution of block-segmented difference signals. In other words, FIG. 4C shows a distribution 30c of which the minimum value MIN is equal to $\Delta/2$, a distribution 30b (denoted by a dotted line) that crosses value 0 as with the distribution shown in FIG. 4B, and a distribution 30c (denoted by a dotted line) of which the maximum value MAX is equal to $-\Delta/2$. In this embodiment, as with the frequency distribution 30a, when the condition (MIN$\geq\Delta/2$) is satisfied, the second quantizing mode is applied. In the second quantizing mode, the above-described code conversion is performed. On the decoding side, the reverse code conversion from a two-bit code into a three-bit code is performed and the three-bit code is dequantized.

When the difference signals with the frequency distribution 30a shown in FIG. 4C are quantized in the second quantizing mode, quantized output data 100 to 111 in the range from MIN to MAX is converted into quantized output data 00 to 11. On the decoding side, in contrast, quantized output data 00 to 11 are converted into data 100 to 111. As with the three-bit quantized output data in the first quantizing mode, the three-bit codes are converted into representative values so as to perform the dequantizing process.

Unlike with the above-described embodiment, when the maximum value MAX of the difference signals of a block is smaller than $-\Delta/2$ (for example, the frequency distribution 30c in FIG. 4C), the second quantizing mode may be applied. Alternatively, when the minimum value MIN is equal to or larger than 0 (MIN$\geq$0) or when the maximum value MAX is equal to or smaller than 0 (MAX$\leq$0), the second quantizing mode may be applied.

FIG. 5 shows an example of the structure of the quantizing circuit 6. Block-segmented difference signals are supplied from the delaying circuit 4 (shown in FIG. 2) to an input terminal 15. The input difference signals are supplied to an input terminal of a switching circuit 16 switched with the mode signal MODE. Output terminals a and b of the switching circuit 16 are connected to quantizing units 17a and 17b that generate for example three-bit output data, respectively. The quantizing unit 17b is connected to a code converting circuit 18. The code converting circuit 18 converts a three-bit code into a two-bit code. Output data of the quantizing unit 17a or 17b is obtained from an output terminal 19.

When the difference signals of the block satisfies the relation of (MIN$\geq\Delta/2$), the mode determining circuit 5 assigns the second quantizing mode to the mode signal MODE. Otherwise, the mode determining circuit 5 assigns the first quantizing mode to the mode signal MODE. In the first quantizing mode, the output terminal a of the switching circuit 16 is selected. In the second quantizing mode, the output terminal b of the switching circuit 16 is selected. Thus, in the first quantizing mode, the output terminal 19 outputs quantized output data of three bits. In the second quantizing mode, the output terminal 19 outputs quantized output data of two bits. The quantizing units 17a and 17b may be commonly structured.

Returning back to FIG. 2, the output data of the quantizing circuit 6 is supplied to a bit plane encoding circuit 7. The bit plane encoding circuit 7 divides the code q of n bits (for example, two bits) into an MSB (most significant bit) plane and an LSB (least significant bit) plane. The MSB plane is a set of MSBs of two-bit quantized values that are supplied. On the other hand, the LSB plane is a set of LSBs of two-bit quantized values that are supplied. FIG. 6A shows one screen that is composed of (4×3=12 blocks), each block containing the code q of (4×4) different signals.

In FIG. 6A, for example, values 0, 1, 2, and 3 of the code q of 2 bits represent (00), (01), (10), and (11), respectively. In the example shown in FIG. 6A, the bit plane encoding circuit 7 divides the code q of one screen into the MSB plane and the LSB plane as shown in FIG. 6B. When the number of quantizing bits is three, an intermediate bit plane is also formed. In the embodiment of the present invention, with the two quantizing modes, two-bit or three-bit quantized output data is generated. When bit planes are formed, it is necessary to know the number of bits of quantized output data beforehand. To do that, the mode signal MODE is supplied to the bit plane encoding circuit 7.

Each bit plane generated by the bit plane encoding circuit 7 is supplied to a variable-length-code encoding circuit 8. The variable-length-code encoding circuit 8 performs the variable-length-code encoding process for each bit plane. In other words, the variable-length-code encoding circuit 8 performs the run-length-code encoding process (for example, MMR (modified MR) process) for each bit plane. The output data of the variable-length-code encoding circuit 8 is supplied to a framing circuit 9. The mode signal MODE is also supplied to the framing circuit 9. The mode signal MODE and the output data of the variable-length-code encoding circuit 8 are obtained as frame structured data from an output terminal 10.

Figure 7:
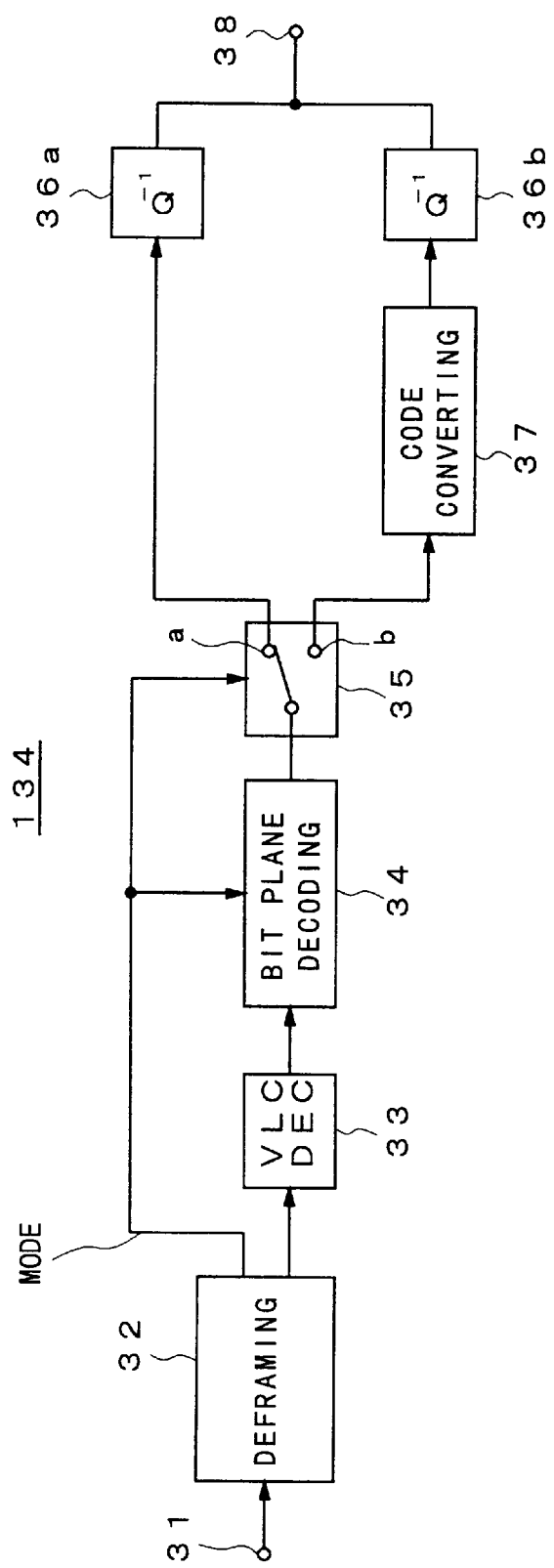
FIG. 7 is a block diagram showing the structure of a decoding unit according to the embodiment of the present invention.

Next, with reference to FIG. 7, an example of the decoding unit 134 shown in FIG. 1 will be described. Reproduced data as output data of the error-correction-code decoder 133 or received data is supplied to an input terminal 31 of the decoding unit 134. A deframing circuit 32 separates codes of variable-length-code encoded difference signals from the mode signal MODE. The separated difference signals are decoded by a variable-length-code decoding circuit 33. The variable-length-code decoding circuit 33 corresponds to the variable-length-code encoding circuit 13. The decoded output data of the variable-length-code decoding circuit 33 is supplied to a bit plane decoding circuit 34. The bit plane decoding circuit 34 precisely composites bit planes corresponding to the separated mode signal MODE.

The output data of the bit plane decoding circuit 34 is supplied to an input terminal of a switching circuit 35. The switching circuit 35 is controlled with the mode signal MODE. When the mode signal MODE represents the first quantizing mode, an output terminal a of the switching circuit 35 is selected. When the mode signal MODE represents the second quantizing mode, an output terminal b of the switching circuit 35 is selected. The output terminal a of the switching circuit 35 is connected to a dequantizing unit 36a that dequantizes three-bit quantized codes and generates dequantized values. The output terminal b of the switching circuit 35 is connected to a code converting circuit 37 that converts two-bit quantized output data into three-bit codes. The code converting circuit 37 is connected to a dequantizing unit 36b. As with the dequantizing unit 36a, the dequantizing unit 36b converts three-bit codes into restored values.

The restored values generated by the dequantizing units 36a and 36b (namely, decoded block-segmented difference signals) are obtained from an output terminal 38. The decoded difference signals are supplied from the output terminal 38 to the block desegmenting circuit 135 (see FIG. 1). The dequantizing units 36a and 36b may be commonly structured.

Next, a hierarchical encoding apparatus according to a second embodiment of the present invention will be described. In the hierarchical encoding apparatus, data is predicated between hierarchical levels. In addition, by applying a simple arithmetic operation for data between hierarchical levels, the number of pixels to be encoded can be prevented from increasing.

Figure 8:
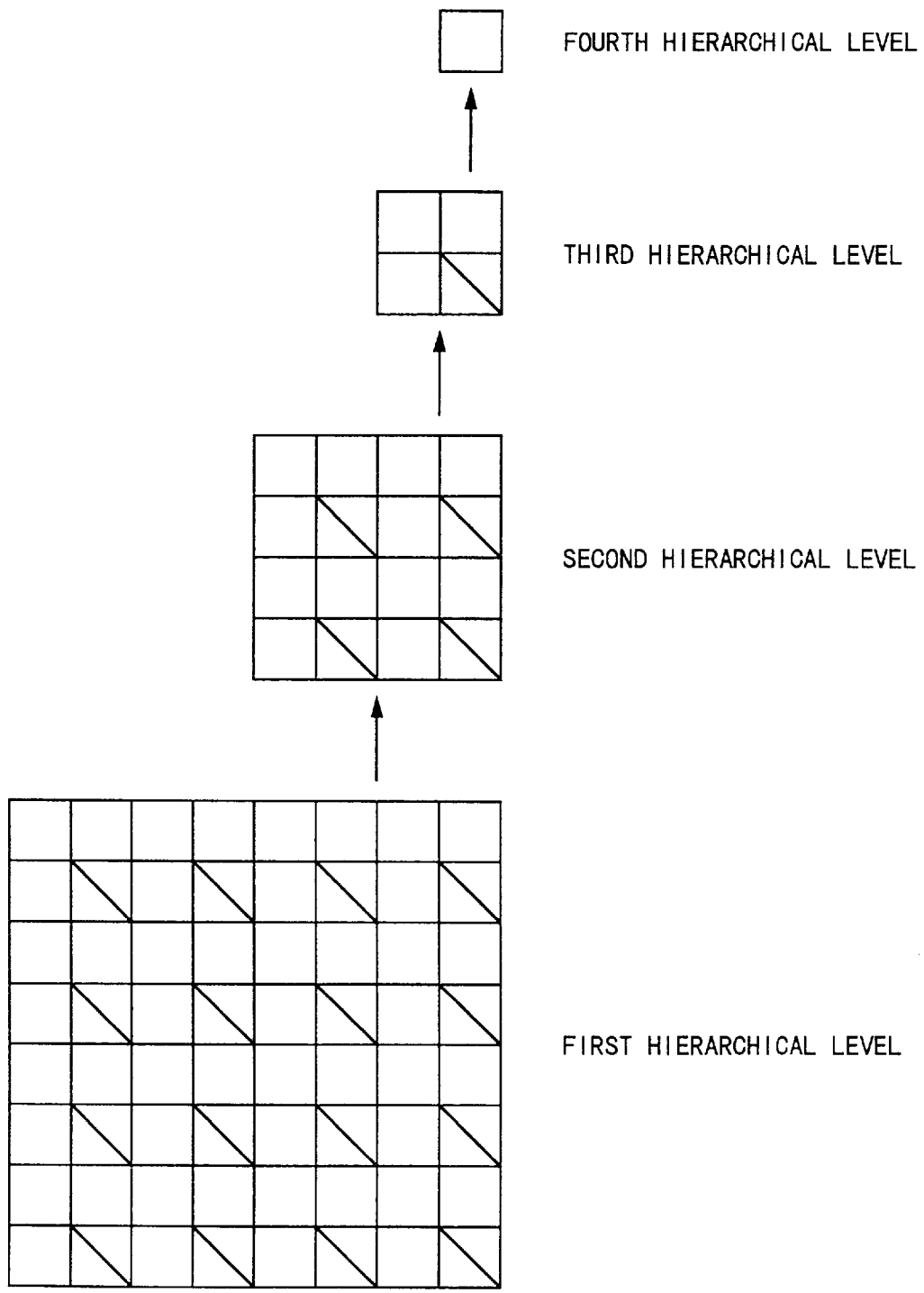
FIG. 8 is a schematic diagram for explaining an example of a hierarchical encoding process.

With reference to FIG. 8, the hierarchical encoding method will be described. FIG. 8 is a schematic diagram showing a four-level hierarchical structure having a first hierarchical level as the lowest hierarchical level (original picture) to a fourth hierarchical level as the highest hierarchical level. For example, when data of a higher hierarchical level is generated with the average value of four pixels of the lower hierarchical level that spatially corresponds thereto, the number of pixels to be transmitted can be prevented from increasing.

In other words, when data of the higher hierarchical level is denoted by M and pixel values of the lower hierarchical level are denoted by $x_0$, $x_1$, $x_2$, and $x_3$, data M is formed by the following formula.

$$M = \frac{1}{4} \cdot (x_0 + x_1 + x_2 + x_3)$$

The data M and three of four pieces of data (for example, other than $x_3$) are transmitted. On the receiving side or the reproducing side, the pixel $x_3$ that was not transmitted can be easily restored by the following simple arithmetic expression.

$$x_3 = 4 \cdot M - (x_0 + x_1 + x_2)$$

In FIG. 8, hatched squares represent pixels that are not transmitted.

FIG. 9 shows the structure of a five-level hierarchical encoding process corresponding to the above-described average calculating method. In this example, it is assumed that the first hierarchical level is a level with resolution of an input picture. The block size of the first hierarchical level is (1×1). Data of the second hierarchical level is generated by averaging four pixels of data of the first hierarchical level. In this example, data $x_2(0)$ of the second hierarchical level is generated by averaging the data $x_1(0)$ to $x_1(3)$ of the first hierarchical level. Likewise, data $x_2(1)$ to $x_2(3)$ of the second hierarchical level adjacent to $x_2(0)$ are generated by averaging four pixels of the first hierarchical level. The block size of the second hierarchical level is (½×½).

Data of the third hierarchical level is generated by averaging four pixels of the second hierarchical level that spatially corresponds thereto. The block size of the third hierarchical level is (¼×¼). Likewise, data of the fourth hierarchical level is generated with data of the third hierarchical level. The block size of the fourth hierarchical level is (⅛×⅛). Last, data $x_5(0)$ of the fifth hierarchical level is generated by averaging data $x_4(0)$ to $X_4(3)$ of the fourth hierarchical level. The block size of the fifth hierarchical level is (1/16×1/16).

Figure 10:
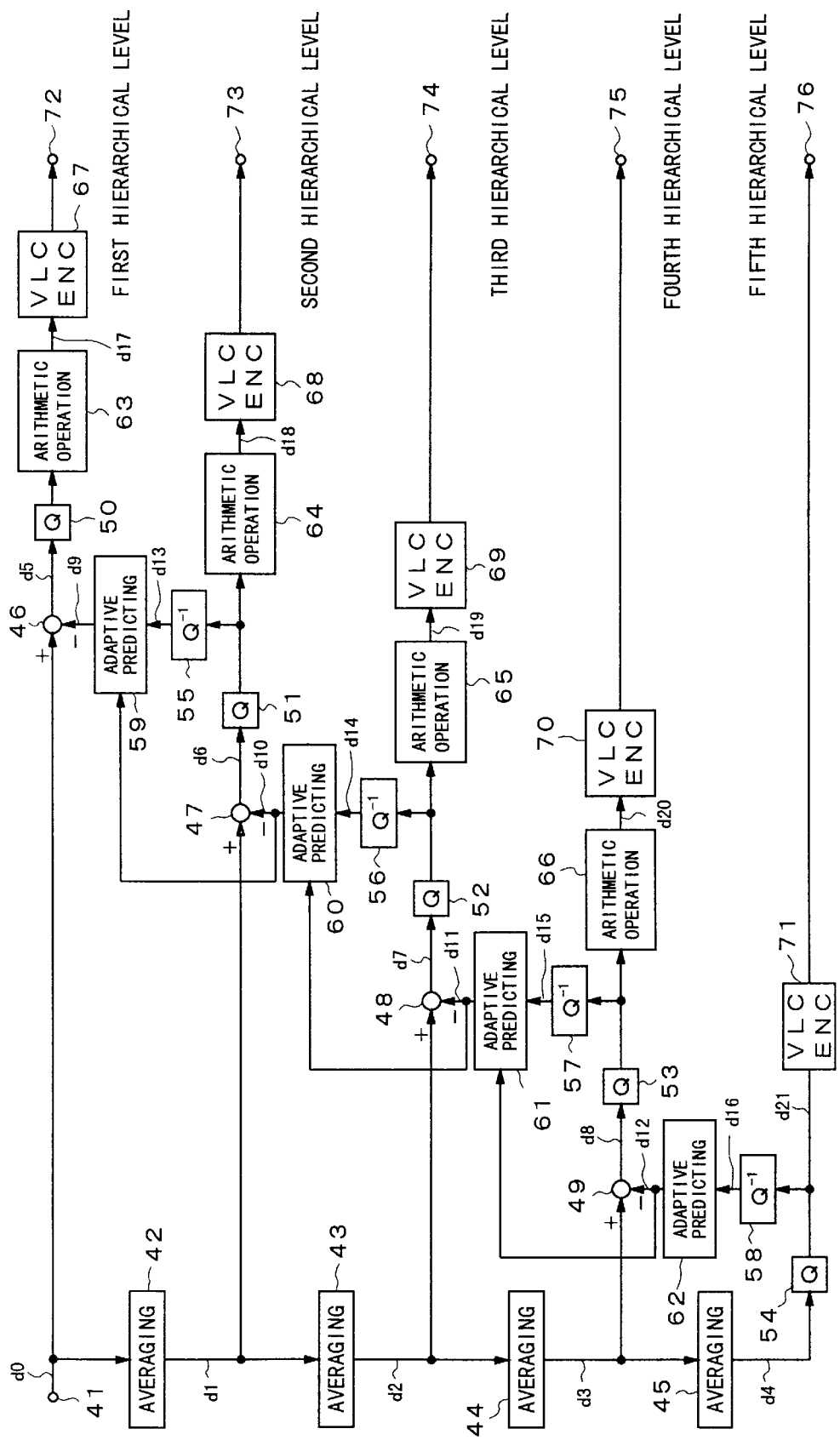
FIG. 10 is a block diagram showing an example of the structure of an encoding side performing the hierarchical encoding process according to a second embodiment of the present invention.

With hierarchically structured data that prevents the number of pixels to be encoded from increasing, by applying the class category adaptive predicting process for data of a higher hierarchical level, data of a lower hierarchical level is predicted and the difference (namely, the difference signals) between the data of the lower hierarchical level and the predicted values. Thus, the amount of data to be transmitted can be decreased. FIG. 10 shows the structure of an encoding unit that performs such a process. First hierarchical level data d0 as input picture data d0 is supplied from an input terminal 41 to an average calculating circuit 42 and a subtracting unit 46. The first hierarchical level data is picture data with the original resolution.

The average value calculating circuit 42 performs the ¼ average value calculating process for the input picture data d0 and generates hierarchical data d1. The hierarchical data d1 corresponds to the second hierarchical level data shown in FIG. 9. The generated hierarchical data d1 is supplied to an average value calculating circuit 43 and a subtracting unit 47.

The average calculating circuit 43 performs the same process as the average value calculating circuit 42 for the hierarchical data d1 and generates hierarchical data d2. The hierarchical data d2 corresponds to the third hierarchical level data. The generated hierarchical data d2 is supplied to an average value calculating circuit 44 and a subtracting unit 48. Likewise, the average value calculating circuit 44 performs the ¼ average value calculating process for the hierarchical data d2 and generates hierarchical data d3. The hierarchical data d3 corresponds to the fourth hierarchical level data. The generated hierarchical data d3 is supplied to an average value calculating circuit 45 and a subtracting unit 49. Likewise, the averaging circuit 45 performs the ¼ average value calculating process for the hierarchical data d3 and generates hierarchical data d4. The hierarchical data d4 corresponds to the fifth hierarchical level data. The generated hierarchical data d4 is supplied to a quantizing unit 54.

Hierarchical data of these five hierarchical levels is predicted between hierarchical levels. The quantizing process for compressing data in the fifth hierarchical level is performed by the quantizing unit 54. Output data d21 of the quantizing unit 54 is supplied to a variable-length-code encoder 71 and a dequantizing unit 58. The output data of the encoder 71 is obtained as fifth hierarchical level data from an output terminal 76. Output data d16 of the dequantizing unit 58 is supplied to a class category adaptive predicting circuit 62.

The class category adaptive predicting circuit 62 performs the predicting process with the data d16 and generates a predicted value d12 of the fourth hierarchical level data. The predicted value d12 is supplied to a subtracting unit 49. The subtracting unit 49 obtains the difference value between the hierarchical data d3 supplied from the average value calculating circuit 44 and the predicted value d12 and supplies the obtained difference value d8 to a quantizing unit 53.

As with the quantizing unit 54, the quantizing unit 53 requantizes the difference value d8 in such a manner that the number of quantizing bits decreases. The output data of the quantizing unit 53 is supplied to a calculating unit 66 and a dequantizing unit 57. The calculating unit 66 performs the thin-out process for thinning out one of four pixels and supplies data d20 to a variable-length-code encoder 70. The variable-length-code encoder 70 encodes the data d20. The output data of the encoder 70 is obtained as fourth hierarchical level data from an output terminal 75.

The fourth hierarchical level data d12 predicted by the class category adaptive predicting circuit 62 and the output data (decoded difference signal) d15 of the dequantizing unit 57 are supplied to a class category adaptive predicting circuit 61. The class category adaptive predicting circuit 61 adds the data d12 and the data d15, forms locally decoded data of the fourth hierarchical level, performs the predicting process with the locally decoded data, generates a predicted value d11 of the third hierarchical level data, and supplies the predicted value d11 to a subtracting unit 48. The subtracting unit 48 obtains the difference value between the data d2 supplied from the average value calculating circuit 43 and the predicted value d11 and supplies the difference value d7 to a quantizing unit 52.

The output data of the quantizing unit 52 is supplied to a calculating unit 65 and a dequantizing unit 56. The calculating unit 65 performs the thin-out process for thinning out one of four pixels and supplies third hierarchical level data d19 to a variable-length-code encoder 69. Output data of the encoder 69 is obtained as third hierarchical level data from an output terminal 74.

The third hierarchical level data d11 predicted by the class category adaptive predicting circuit 61 and output data d14 of the dequantizing unit 56 are supplied to a class category adaptive predicting circuit 60. The class category adaptive predicting circuit 60 adds the data d11 and the data d14, forms locally decoded data of the third hierarchical level, performs the predicting process with the locally decoded data, generates a predicted value d10 of the second hierarchical level, and supplies the predicted value d10 to the subtracting unit 47. The subtracting unit 47 obtains the difference value between the data d1 supplied from the average value calculating circuit 42 and the predicted value d10 and supplies the difference value d6 to a quantizing unit 51.

The output data of the quantizing unit 51 is supplied to a calculating unit 64 and a dequantizing unit 55. The calculating unit 64 performs the thin-out process for thinning out one of four pixels and supplies second hierarchical level data d18 to a variable-length-code encoder 68. The output data of the encoder 68 is obtained as second hierarchical level data from an output terminal 73.

The second hierarchical level data d10 predicted by the class category adaptive predicting circuit 60 and output data d13 of the dequantizing unit 55 are supplied to a class category adaptive predicting circuit 59. The class category adaptive predicting circuit 59 adds the data d10 and the data d13, forms locally decoded data of the second hierarchical level, performs the predicting process with the locally decoded data, generates a predicted value d9 of the first hierarchical level, and supplies the predicted value d9 to the subtracting unit 46. The subtracting unit 46 obtains the difference value between the input picture data d0 supplied from the input terminal 41 and the predicted value d9 and supplies the difference value d5 to a quantizing unit 50.

The output data of the quantizing unit 50 is supplied to a calculating unit 63. The calculating unit 63 performs the thin-out process for thinning out one of four pixels and supplies first hierarchical level data d17 to a variable-length-length code encoder 67. The output data of the encoder 67 is obtained as first hierarchical level data from an output terminal 72.

Figure 12:
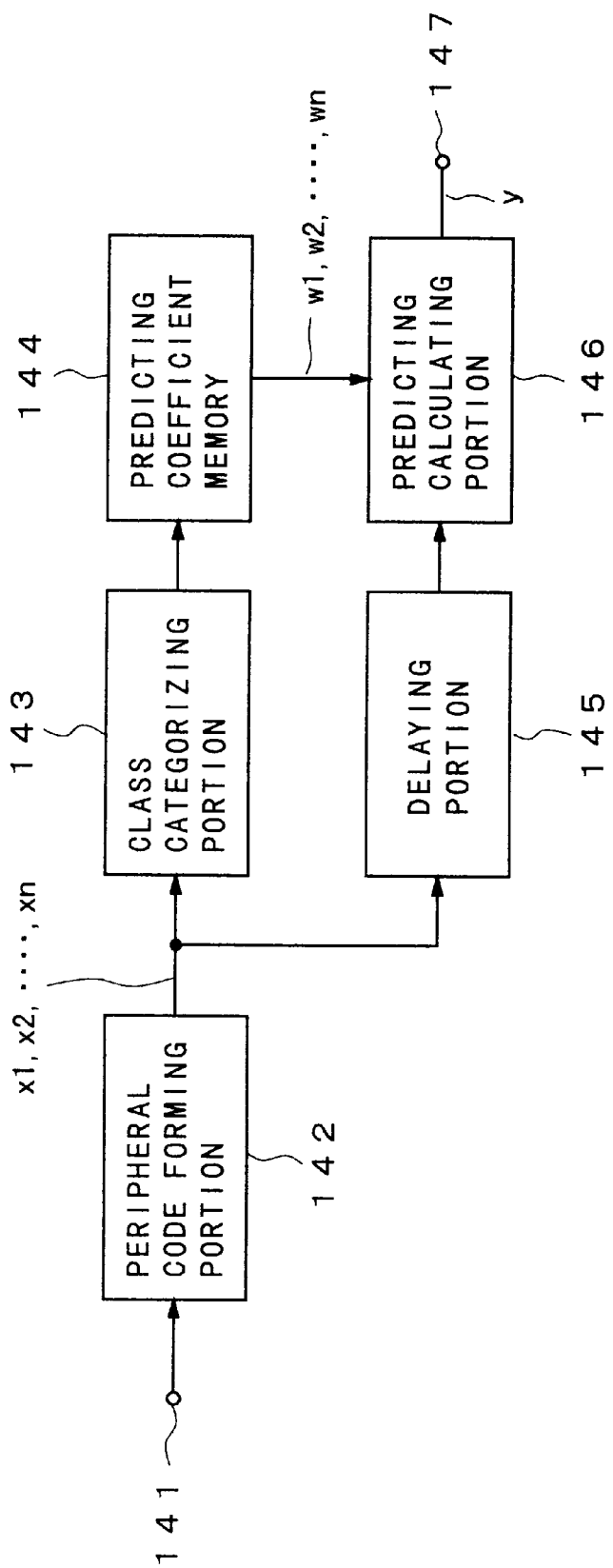
FIG. 12 is a block diagram showing an example of the structure of a class category adaptively predicting circuit according to the second embodiment of the present invention.

The class category adaptive predicting circuits 59, 60, 61, and 62 predict pixels of lower hierarchical levels corresponding to distributions of levels of a plurality of pixels spatially adjacent thereto (included in the higher hierarchical levels). FIG. 12 shows an example of the structure of the class category adaptive predicting circuit. Locally decoded data is supplied from an input terminal 141 to a peripheral code value forming portion 142. The peripheral code value forming portion 142 forms a plurality of data $x_1, x_2, \ldots,$ and $x_n$ of a lower hierarchical level adjacent to a pixel to be predicted. The peripheral code values are supplied to a class categorizing portion 143 and a delaying portion 145. The class categorizing portion 143 outputs class codes corresponding to a pattern of the distribution of the levels the peripheral code values $x_1$ to $x_n$. As the class codes, peripheral code values may be used. However, since the number of classes becomes large, a technique for compressing bits of each peripheral code into one bit is used. An example of this technique is the ADRC method. The class codes generated by the class categorizing portion 143 are supplied to a predicting coefficient memory 144 as address signals.

The predicting coefficient memory 144 stores pre-learnt predicting coefficients $w_1$ to $w_n$ at individual addresses. In other words, with a teacher signal (for example, data of the fourth hierarchical level) and an input signal (for example, data of the fifth hierarchical level formed by the average value calculating process with data of the fourth hierarchical level), a predicted value is obtained by performing the linear combination for a plurality of pieces of data of the input signal and the coefficients. A coefficient for minimizing the sum of square of the difference between the predicted value and the true value of the teacher signal is obtained by the method of least squares for each class. The predicting coefficients $w_1$ to $w_n$ read from the predicting coefficient memory 144 corresponding to class codes and the peripheral code values $x_1$ to $x_n$ supplied from the delaying portion 145 are supplied to a prediction calculating portion 146.

The prediction calculating portion 146 calculates a predicted value y by the following linear combination expression.

$$y = w_1 x_1 + w_2 x_2 + \ldots + w_n x_n$$

The predicted value y obtained by the prediction calculating portion 146 is obtained from an output terminal 147. The peripheral code values used for categorizing classes may be different from the peripheral code values used for the prediction calculating process.

The same structure as the encoding unit 125 (see FIG. 2) according to the above-described embodiment is also disposed on the hierarchical-code encoder side. In other words, each of the quantizing units 50, 51, 52, 53, and 54 has the same structure as the front portion of up to the quantizing circuit 6. In addition, each of the variable-length-code encoders 67, 68, 69, 70, and 71 has the same structure as the rear portion after the bit plane encoding circuit 7.

Figure 11:
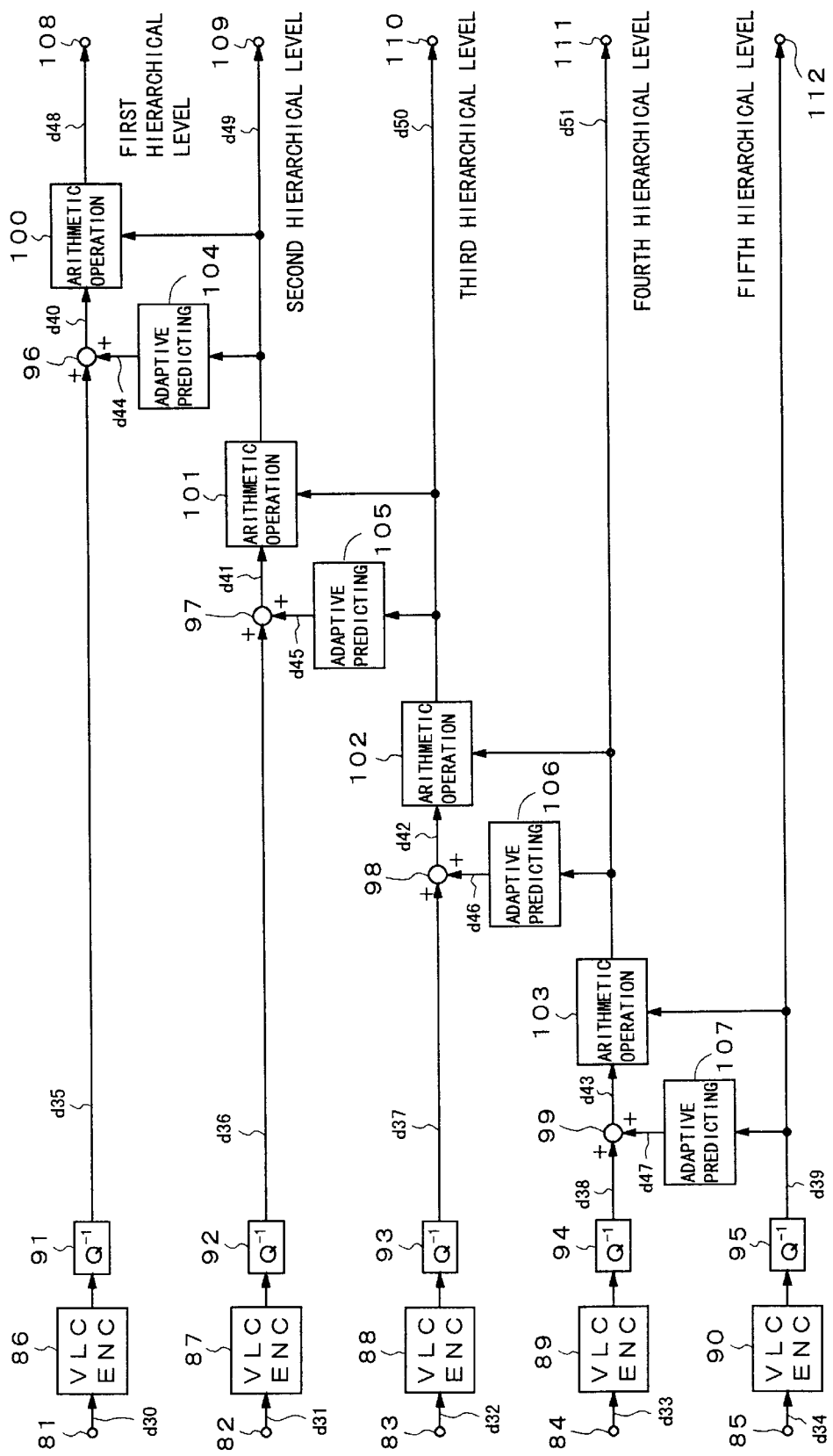
FIG. 11 is a block diagram showing an example of the decoding side according to the second embodiment of the present invention.

FIG. 11 shows an example of the structure of the hierarchical-code decoder side corresponding to the above-described encoder. Data of each hierarchical level generated on the encoder side is supplied as d30 to d34 to input terminals 81, 82, 83, 84, and 85, respectively. Variable-length-code decoders 86, 87, 88, 89, and 90 perform the variable-length-code decoding process for the hierarchical data d30 to d34, respectively. The variable-length-code decoders 86, 87, 88, 89, and 90 are connected to dequantizing units 91, 92, 93, 94, and 95, respectively.

The dequantizing unit 95 dequantizes the fifth hierarchical level input data d34 and supplies picture data d39 to a class category adaptive predicting circuit 107 and a calculating unit 103. The picture data d39 is obtained as picture output data of the fifth hierarchical level from an output terminal 112.

The class category adaptive predicting circuit 107 performs the class category adaptive predicting process for picture data of the fourth hierarchical level and generates a predicted value d47 of the fourth hierarchical level data. Data d38 (namely, a difference value) supplied from the dequantizing unit 94 and the predicted value d47 are added by an adding unit 99. Picture data d43 is supplied from the adding unit 99 to a calculating unit 103. The calculating unit 103 performs the abovedescribed calculation for obtaining the value of each pixel that was not transmitted. With the picture data d39 supplied from the dequantizing unit 95 and the picture data d43, the calculating unit 103 restores all pixel values of the fourth hierarchical level. All the pixel values restored by the calculating unit 103 are supplied as picture data d51 to a class category adaptive predicting circuit 106 and a calculating unit 102. In addition, the picture data d51 is obtained as output data of the fourth hierarchical level from an output terminal 111.

The class category adaptive predicting circuit 106 performs the class category adaptive predicting process for picture data of the third hierarchical level and generates a predicted value d46 of the third hierarchical level data. Data d37 supplied from the dequantizing unit 93 and the predicted value d46 are added by an adding unit 98. The adding unit 98 supplies picture data d42 to the calculating unit 102. The calculating unit 102 obtains the value of each pixel that was not transmitted. With the picture data d51 supplied from the calculating portion 103 and the picture data d42, the calculating unit 102 restores all pixel values of the third hierarchical level. All the pixel values restored by the calculating portion 102 is supplied as picture data d50 to a class category adaptive predicting circuit 105 and a calculating portion 101. In addition, the picture data d50 is obtained as output data of the third hierarchical level from an output terminal 110.

The class category adaptive predicting circuit 105 performs the class category adaptive predicting process for picture data of the second hierarchical level and generates a predicted value d45 of the second hierarchical level data. Data d36 supplied from the dequantizing unit 92 and the predicted value d45 are added by an adding unit 97. The adding unit 97 supplies picture data d41 to the calculating unit 101. The calculating unit 101 obtains the value of each pixel that was not transmitted. With the picture data d50 supplied from the calculating unit 102 and the picture data d41, the calculating unit 101 restores all pixel values of the second hierarchical level. All the pixel values restored by the calculating unit 101 are supplied as picture data d49 to a class category adaptive predicting circuit 104 and a calculating unit 100. In addition, the picture data d49 is obtained as output data of the second hierarchical level from an output terminal 109.

The class category adaptive predicting circuit 104 performs the class adaptive predicting process for picture data of the first hierarchical level and generates a predicted value d44 of the first hierarchical level data. Data d35 supplied from the dequantizing unit 91 and the predicted value 44 are added by an adding unit 96. The adding unit 96 supplies picture data d40 to the calculating unit 100. The calculating unit 100 obtains the value of each pixel that was not transmitted. With the picture data d49 supplied from the calculating unit 101 and the picture data d40, the calculating unit 100 restores all pixel values of the first hierarchical level. All the pixel values as picture data d48 restored by the calculating unit 100 are obtained as output data of the first hierarchical level from an output terminal 108. Each of the class category adaptive predicting circuits 104, 105, 106, and 107 has the above-described practical structure as shown in FIG. 12. Thus, in the hierarchical-code encoding process for preventing the number of pixels to be encoded from increasing, with the class category adaptive predicting process, the encoding efficiency can be improved.

Each of the variable-length-code decoders 86, 87, 88, 89, and 90 and the dequantizing units 91, 92, 93, 94, and 95 has the same structure as the decoding unit 134 according to the above-described embodiment. Thus, as with the above-described first embodiment, in the second embodiment of which the present invention is applied for the above-described hierarchical-code encoding process, when the range of levels of block-segmented difference signals satisfies a predetermined condition, the amount of data can be further There are various methods for transmitting the mode signal MODE and the encoded difference signals according to the present invention. For example, after mode signals for one frame are transmitted at a time, encoded difference signals can be transmitted. In addition, according to the present invention, three or more quantizing modes can be assigned. For example, in consideration of not only the range of levels of difference signals of a block, but a dynamic range DR thereof, when the dynamic range DR is small, a third quantizing mode with a smaller number of quantizing bits than the second quantizing mode may be assigned. Moreover, corresponding to the range of levels of quantized output data of the first quantizing mode, a proper quantizing mode may be determined.

In addition, the present invention can be applied for the quantizing process for quantizing difference signals generated by other than the prediction encoding process. Moreover, the present invention can be applied for a system having a buffering structure that controls the quantizing step width and thereby the amount of data generated.

According to the present invention, a frequency distribution of block segmented difference signals that does not cross 0 is detected. In this situation, the number of quantizing bits can be further decreased and thereby the amount of data to be transmitted can be further decreased.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An information signal encoding apparatus for generating at least first hierarchical data and second hierarchical data by an input digital information signal, encoding the first hierarchical data and the second hierarchical data, and transmitting the encoded data, the apparatus comprising:

means for forming the second hierarchical data with a resolution lower than the first hierarchical data;

means for predicting the first hierarchical data by the second hierarchical data;

means for forming difference signals representing differences between the predicted data and the first hierarchical data;

means for block segmenting the difference signals;

means for detecting a maximum value and a minimum value of the difference signals of each block;

mode determining means for determining whether or not the range of levels of the difference signals of each block crosses 0 corresponding to the maximum value and the minimum value, assigning a first quantizing mode when the range of the levels crosses 0, and assigning a second quantizing mode when the range of the levels does not cross 0;

quantizing means for quantizing the difference signals with a predetermined number of bits smaller than the original number of bits in the first quantizing mode and for quantizing the difference signals with a predetermined number of bits smaller than the original number of bits and performing a code conversion for decreasing the number of bits in the second quantizing mode; and transmitting means for transmitting information identifying the first quantizing mode and the second quantizing mode and output data of said quantizing means.

2. An information signal encoding method for generating at least first hierarchical data and second hierarchical data by an input digital information signal, encoding the first hierarchical data and the second hierarchical data, and transmitting the encoded data, the method comprising the steps of:

(a) forming the second hierarchical data with a resolution lower than the first hierarchical data;

(b) predicting the first hierarchical data by the second hierarchical data;

(c) forming difference signals representing differences between the predicted data and the first hierarchical data;

(d) block segmenting the difference signals;

(e) detecting a maximum value and a minimum value of the difference signals of each block;

(f) determining whether or not the range of levels of the difference signals of each block crosses 0 corresponding to the maximum value and the minimum value, assigning a first quantizing mode when the range of the levels crosses 0, and assigning a second quantizing mode when the range of the levels does not cross 0;

(g) quantizing the difference signals with a predetermined number of bits smaller than the original number of bits in the first quantizing mode and quantizing the difference signals with a predetermined number of bits smaller than the original number of bits and performing a code conversion for decreasing the number of bits in the second quantizing mode; and (h) transmitting information identifying the first quantizing mode and the second quantizing mode and output data of the step (g).

* * * * *